(12) United States Patent
Duijkers et al.

(10) Patent No.: US 6,600,277 B2
(45) Date of Patent: Jul. 29, 2003

(54) POWER SUPPLY

(75) Inventors: Peter Antoon Duijkers, Nijmegen (NL); Jan-Harm Nieland, Nijmegen (NL); Johannes Albertus Peetoom, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/988,947

(22) Filed: Nov. 19, 2001

(65) Prior Publication Data
US 2002/0097033 A1 Jul. 25, 2002

(30) Foreign Application Priority Data
Nov. 22, 2000 (EP) .............................. 00204125

(51) Int. Cl.[7] .............................. H01J 29/70; G09G 1/04
(52) U.S. Cl. ........................ 315/408; 315/397; 323/316
(58) Field of Search ................... 323/316, 281, 323/282, 284; 330/297, 127, 267; 315/371, 408, 395, 396, 397

(56) References Cited

U.S. PATENT DOCUMENTS

| | | | | | |
|---|---|---|---|---|---|
| 4,314,184 | A | * | 2/1982 | Ryan | 315/408 |
| 4,712,047 | A | * | 12/1987 | Weindrof | 315/397 |
| 4,755,739 | A | * | 7/1988 | Van Buul | 323/222 |
| 5,450,037 | A | * | 9/1995 | Kanaya et al. | 330/297 |
| 6,218,791 | B1 | * | 4/2001 | Teuling et al. | 315/408 |

* cited by examiner

Primary Examiner—Rajnikant B. Patel
(74) Attorney, Agent, or Firm—Laurie E. Gathman

(57) ABSTRACT

The invention relates to a power supply (9) for a deflection circuit (1), that comprises a deflection coil (2) for connection to a picture tube, a drive circuit (4,5,6) connected to the deflection coil (2), and a deflection controller (3) for controlling the drive circuit (4,5,6). According to the invention the power supply (9) comprises a first input (10,11) connection to an output of the drive circuit (4,5,6) and the deflection coil, a second input connected to a power source ($V_{input}$), a power supply output (13) connected to the drive circuit (4,5,6), and an adapter for adapting the power supply ($V_P$) to the output (13) from the second input ($V_{input}$) dependent on the first input (10,11).

19 Claims, 6 Drawing Sheets

POWER SUPPLY

BACKGROUND OF THE INVENTION

The present invention relates to a power supply for a device that comprises a coil, and a drive circuit coupled to the coil. The invention also relates to a display apparatus comprising such a power supply.

In known configurations, the power supply provides a preferably stable, constant power supply voltage. The known configurations have for a disadvantage, that the power losses are considerable, especially in the part of a scan of the picture display tube, wherein the current to be output to the deflection coil has an absolute value, which is lower than a maximum value.

It is, inter alia, an object of the invention to provide an improved power supply. To this end, the invention provides a power supply as defined in the independent claims. Advantageous embodiments are defined in the dependent claims.

SUMMARY OF THE INVENTION

A preferred embodiment of the present invention provides a power supply for a vertical deflection circuit that comprises a deflection coil for connection to a picture tube, a drive circuit connected to the deflection coil, and a deflection controller for controlling the drive circuit, in which the power supply comprises a first input connected to an output of the drive circuit and one side of the deflection coil, a second input connected to a power source, a power supply output connected to the drive circuit, and an adapter for adapting the power supply to the output from the second input dependent on the first input.

Therefore the power supply according to the present invention is based on the concept of monitoring the voltage at the output of the drive circuit. The power supply is adapted by the adapter, dependent on the thus obtained information. Therefore, the power loss in the vertical output circuit is, according to the present invention, minimized, when the above mentioned voltage level is regulated to a level, where the drive circuit at the output thereof shows a linear behavior. Thereby, the supply voltage is as low as necessary for a good operation. Preferably, the supply voltage follows the voltage over the deflection coil, but is minimally equal to the minimum voltage required by the vertical deflection output circuit IC.

The drive circuit can comprise a bridge circuit having two outputs to the deflection coil and a return or feedback input, and where the power supply comprises two first inputs, each connected to a side of output stages to the deflection coil. In such an embodiment, for the first half of a scan, the voltage between the first of the two outputs and ground is monitored, whereas for the second part of a scan, the voltage between the second of the two outputs and ground is observed. The values of the voltages are optimized by adjusting in accordance with the requirements of the deflection coil at a certain point in time of a scan.

Modulating the supply voltage can be done in at least two ways. It can be linear, where a power transistor is used as a variable resistor in series with the vertical deflection output stage. Power consumption is then transferred from the output stage to the modulating power supply. A better way is to use a switch mode power supply. Here the pass transistor is used as a switch. The output can be filtered by an inductor and a capacitor. In this case the total power consumption is greatly reduced. The system needs an inductor and a capacitor that cannot be integrated. The supply voltage of the vertical deflection stage may contain more ripple, which may be visible on the screen if the vertical deflection stage is not good in rejecting the ripple in the power supply. This modulation of the supply may have some effect on the stability of the deflection amplifier. The power supply (ripple) rejection ratio of the amplifier should be high enough not to create visible artifacts on the screen.

An advantage of the invention is that the customer, i.e. the television or monitor set maker, does not have to worry about choosing the right supply voltage for the vertical deflection output stage. The supply modulation circuit will take care that the supply voltage of the output stage is always optimal. Compared to the situation in which the supply voltage is higher than optimal, the power saving can be significant. Another advantage is that the heat sink can be reduced in size.

Further features, embodiments and advantages of the present invention will be described here below in more detail, while referring to the accompanying drawings.

BRIEF DESCRIPTION OF THE DRAWINGS

In the drawings.

In the description and figures of various embodiments, the same reference numbers are used for identical or similar components.

DETAILED DESCRIPTION OF THE INVENTION

Figure 1:
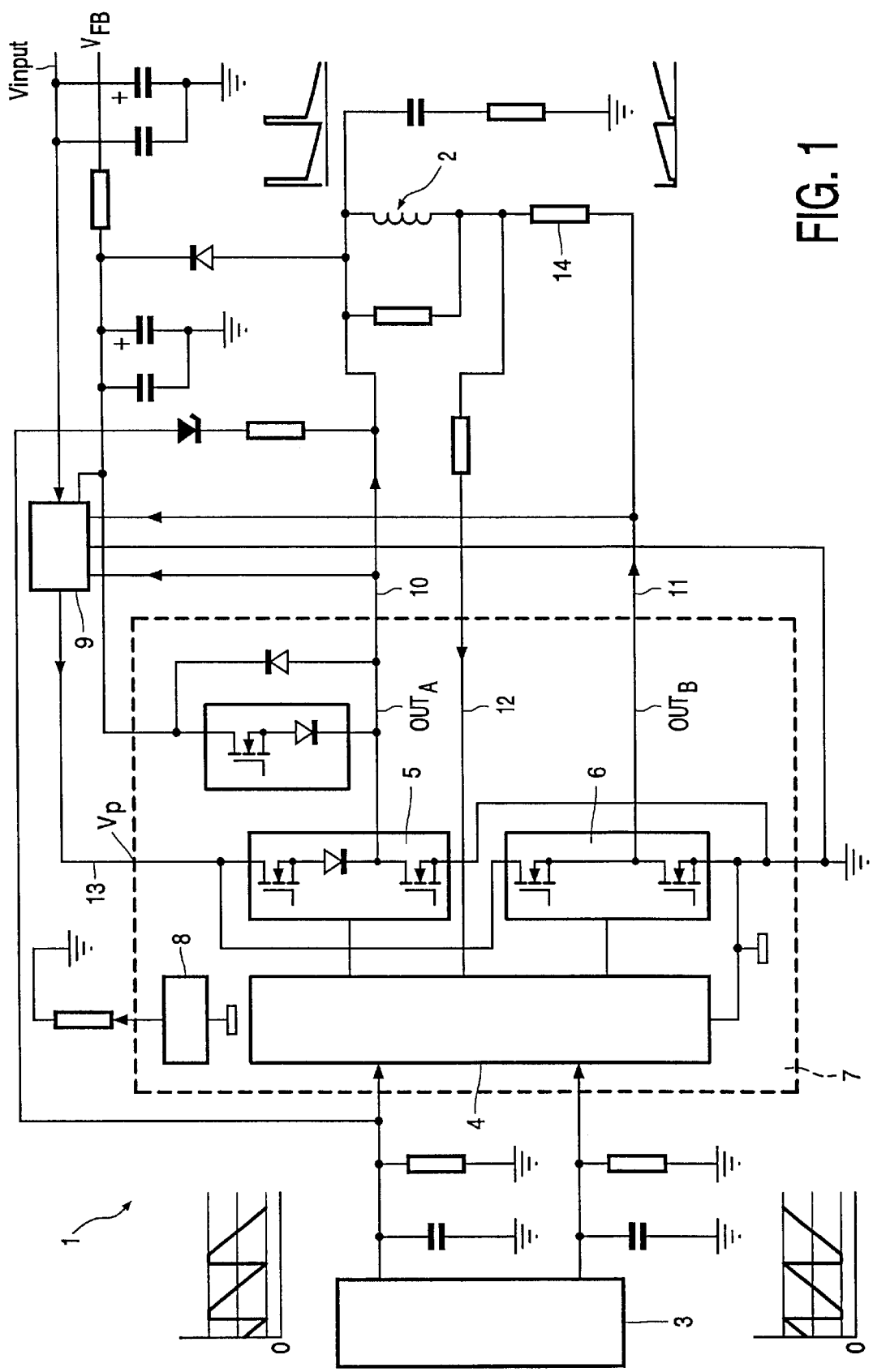
FIG. 1 shows a vertical deflection circuit, in which a power supply according to an embodiment of the present invention is incorporated.

The vertical deflection circuit 1 of FIG. 1 comprises a vertical deflection coil 2 for vertical deflection of a scan over a tube (not shown).

The deflection coil 2 is fed by a first output stage 5 and a second output stage 6, respectively outputting 'OUT$_A$' over line 10 and 'OUT$_B$' over line 11 to the deflection coil 2. A feedback line 12 from the coil 2 is also provided, which is connected to a drive circuit 4 for driving the first and second output stages 5, 6.

The drive circuit 4 and the output stages 5 and 6 are, together with a guard circuit 8, which will hereinafter not be described in any further detail, integrated in a integrated circuit (e.g. TDA8357J), which is designated by reference number 7, referring to a dashed line in FIG. 1. At the input side of the integrated circuit 7 there is a deflection controller 3 for controlling the drive circuit 4.

Further the configuration of FIG. 1 comprises a power supply 9, which is intended at lowering the power consumption of the vertical deflection circuit 1.

The functioning of the vertical deflection circuit is well known for persons skilled in the art, so that further description thereof can be omitted here. However, in relation to the required supply voltage over line 13 to the output stages 5, 6 of the drive circuit 4, the following observations are made. When in the usual, prior art manner a constant, stable supply voltage is used, the following considerations have to be taken into account.

For calculating the minimum required constant stable supply voltage, several specific application parameter values have to be known. These parameters are the required maximum (peak) deflection coil current $I_{coil(peak)}$, the coil parameters (R and L), and the measuring resistance of resistor 14.

The deflection coil resistance has to be multiplied with 1.2 in order to take account of hot conditions.

Values can in a straightforward fashion be obtained for the voltage losses of the vertical output stage. For the first part of the scan the voltage loss is given by $V_{loss(1)}$. For the second part of the scan the voltage loss is given by $V_{loss(2)}$.

The voltage drop across the deflection coil during scan is determined by the coil impedance. For the first part of the scan the inductive contribution and the ohmic contribution to the total coil voltage drop are of opposite sign, while for the second part of the scan the inductive part and the ohmic part have the same sign.

For the vertical frequency the maximum frequency occurring must be applied to the calculations.

The required power supply voltage $V_P$ for the first part of the scan is given by:

$$V_{P(1)} = I_{coil(peak)} \times (R_{coil} + R_M) - L coil \times 2 I_{coil(peak)} \times f_{vert(max)} + V_{loss(1)}$$

The required power supply voltage $V_P$ for the second part of the scan is given by:

$$V_{P(2)} = I_{coil(peak)} \times (R_{coil} + R_M) - L_{coil} \times 2 I_{coil(peak)} \times f_{vert(max)} + V_{loss(2)}$$

The minimum required supply voltage $V_P$ shall be the highest of the two values $V_{P(1)}$ and $V_{P(2)}$. Spread in supply voltage and component values also has to be taken into account.

The total power dissipation is given by the formula:

$$P_{tot} = P_{sup} - P_L$$

The power to be supplied is given by the formula:

$$P_{sup} = V_P \times (I_{coil(peak)}/2) + V_P \times 0.015[A] + 0.3[W]$$

In this formula 0.3[W] represents the average value of losses in the flyback supply.

The average external load power dissipation in the deflection coil and the measuring resistor is given by the formula:

$$P_L = ((I_{coil(peak)})^2)/3 \times (R_{coil} + R_M)$$

It will be clear from the above calculations, that the total power dissipation and in any case the power to be supplied was, according to prior art, directly related to the assumption, that at least the maximum coil current should be taken into account, whereas the required coil current at a certain stage of the scan to be realized with the deflection coil 2, can be as low as zero in the middle of the picture. By always supplying a supply voltage, based on the assumptions above, the total power dissipation will be high.

Figure 2:
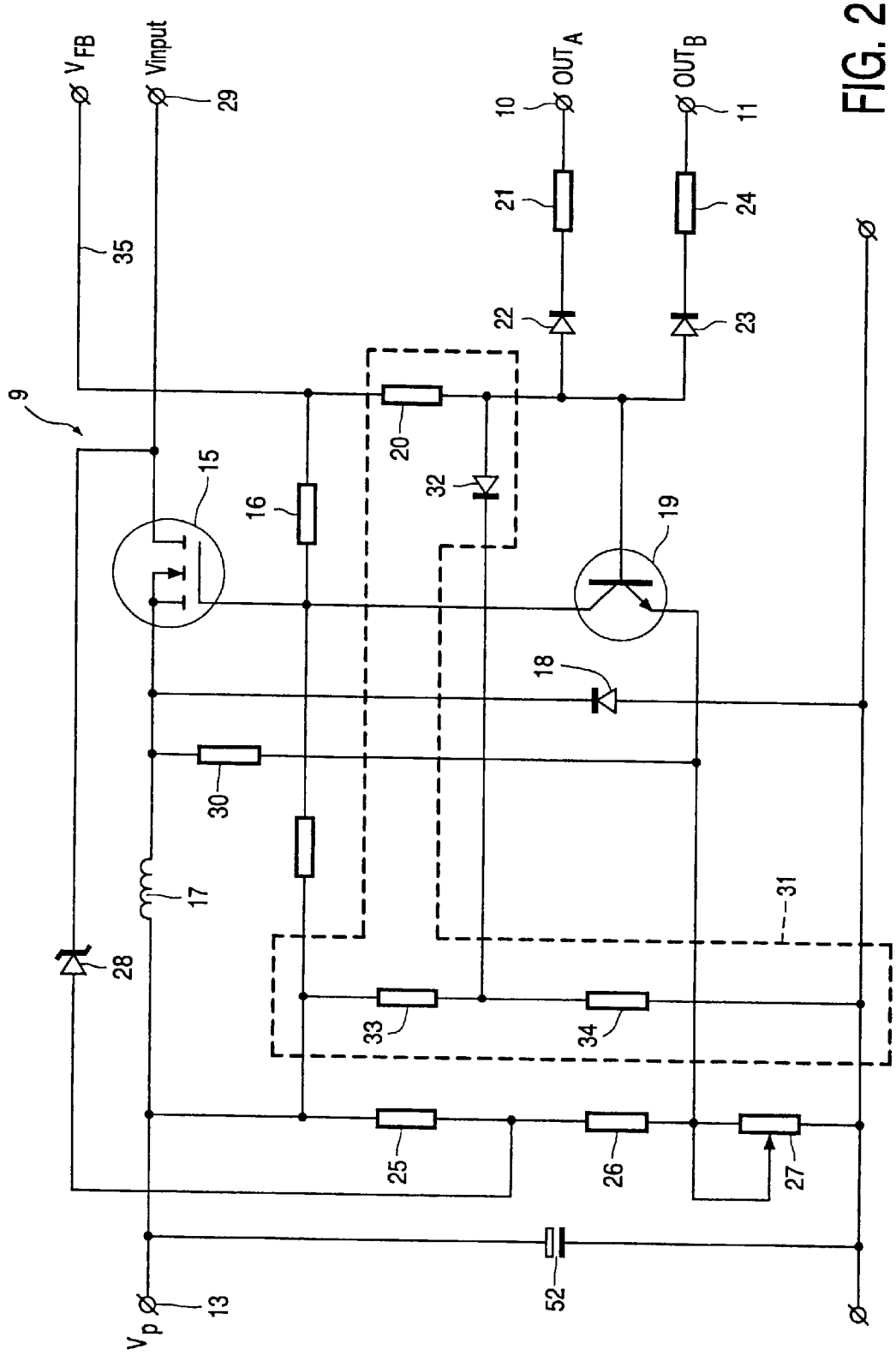
FIG. 2 shows an embodiment of a power supply for use in the vertical deflection circuit of FIG. 1.

Therefore, an aspect of the present invention provides an adaptive power supply, such as it is indicated with reference number 9 in FIG. 1 and an example of which is shown in more detail in FIG. 2. By making the supply voltage $V_P$ a variable, which depends on the actually required coil current and can therefore diminish and increase in the course of one scan, the total power consumption can be lowered considerably.

The power supply 9 monitors the voltage between the conducting output transistor of any one of the output stages 5, 6 and ground.

The power loss in the vertical output circuit or IC 7 is minimized, when the voltage level $V_P$ at line 13 is regulated to such a level, that the behavior of the output device corresponds with a linear behavior, at least by approximation. For the first half of a scan the voltage over $OUT_B$ over line 11 and ground is monitored, while for the second part of a scan the voltage over $OUT_A$ over line 10 and ground is monitored.

The voltages are kept on optimal values via the value of the power supply $V_P$, line 13. The vertical deflection output circuits 5, 6 have an internal mid tap voltage regulation system, as is shown in FIG. 1, which adjusts the drive of both output stages 5, 6, such that the voltage across the coil 2 is optimal. Therefore, because the supply voltage $V_P$ over line 13 is regulated, the mid-tap system will take care of correct DC levels.

In FIG. 2 the configuration of an embodiment of the adaptive power supply 9 in FIG. 1 is shown. The adaptive power supply 9 comprises a switching transistor 15, which is driven into full conductance through a connection via resistor 16 to $V_{FB}$. Because of the occurrence of low voltage drops, a field effect power transistor is used for the switching transistor 15. Further the adaptive power supply 9 comprises an elementary circuit formed by coil 17, diode 18, and capacitor 52 whereas measurement and regulation of the power supply 9 are formed around an additional transistor 19. Measurement of the voltage over line 10 ($OUT_A$) is achieved through a measurement circuit formed by resistors 20 and 21 and diode 22. On the other hand line 11 is measured through a measurement circuit, formed by resistor 20, diode 23 and additional resistor 24. The voltages measured are supplied to the base of transistor 19. There the value is compared to the voltage at the emitter of transistor 19, which is the set value.

However, usually the voltage at the emitter of transistor 19 is not a fully fixed stable value. In order to ensure proper functioning of the adaptive power supply 9, two kinds of information are used.

The first kind of information is set with a resistor divider circuit, formed by resistors 25, 26 and potentiometer 27. The potentiometer 27 is used in order to be able to adjust the circuit. However, a resistor can be used in the place of potentiometer 27, when beforehand it is known what kind of cathode ray tube is used in conjunction with the deflector coil 2. The resistor divider circuit is connected to the output voltage of the system, which is $V_P$ over line 13. Thus also some information is obtained about the value of a required output current. A high output voltage indicated a high current in the output transistors of the output stages 5, 6 of the vertical deflection circuit 1. For a high output current value the voltage losses across the output transistors of the output stages 5, 6 will also become higher, so that the reference value at the emitter also has to be higher. The ideal information is the value of the output current to the deflection coil 2 of the vertical deflection circuit 1.

Further it is observed, that the resistor divider circuit, which is formed by the resistors 25, 26 and potentiometer 27, realizes a start-up function in cooperation with a zener diode 28, which is connected to the input power source 29.

The second kind of information is obtained through resistor 30, which is connected to the source of the power transistor 15. At this side, switching pulses are obtained, which are thus fed into the regulation information at the emitter side of the transistor 19.

In this configuration the system advantageously uses line ripple pulses, which are at all times present in the signal $OUT_A$ and signal $OUT_B$ over lines 10 and 11 respectively because of cross-talk from the horizontal deflection coil (not shown) to the vertical deflection coil 2. The line ripple frequency is for example 15.6 kHz and is therefore obtained and usable as a basic switching frequency for transistor 15. In practice the line frequency can have any value between 10 and 200 kHz.

A power supply 9 with the components described up to now, will tend to lower the supply voltage at the middle of a scan to a very low value, even lower than a minimum value required for the correct functioning of several components therein. Therefore the adaptive power supply 9 is provided with a minimum power supply level set circuit 31, indicated in dashed lines in FIG. 2, and comprising resistor 20, a diode 32 and resistors 33 and 34. Through this minimum power supply level set circuit a minimum power level for output to the vertical deflection circuit 1 is set. The information thus generated is provided to the base of transistor 19 through diode 32.

The power supply circuit 9 further comprises a connection to $V_{FB}$ over line 35. This is an indication of the fly back supply. When the voltage is generated in a television set or monitor the fly back supply voltage can be modulated. In such a case it is better to connect resistor 20 to $V_{input}$ or a stabilized voltage can be generated with the help of zener diode.

Figure 3:
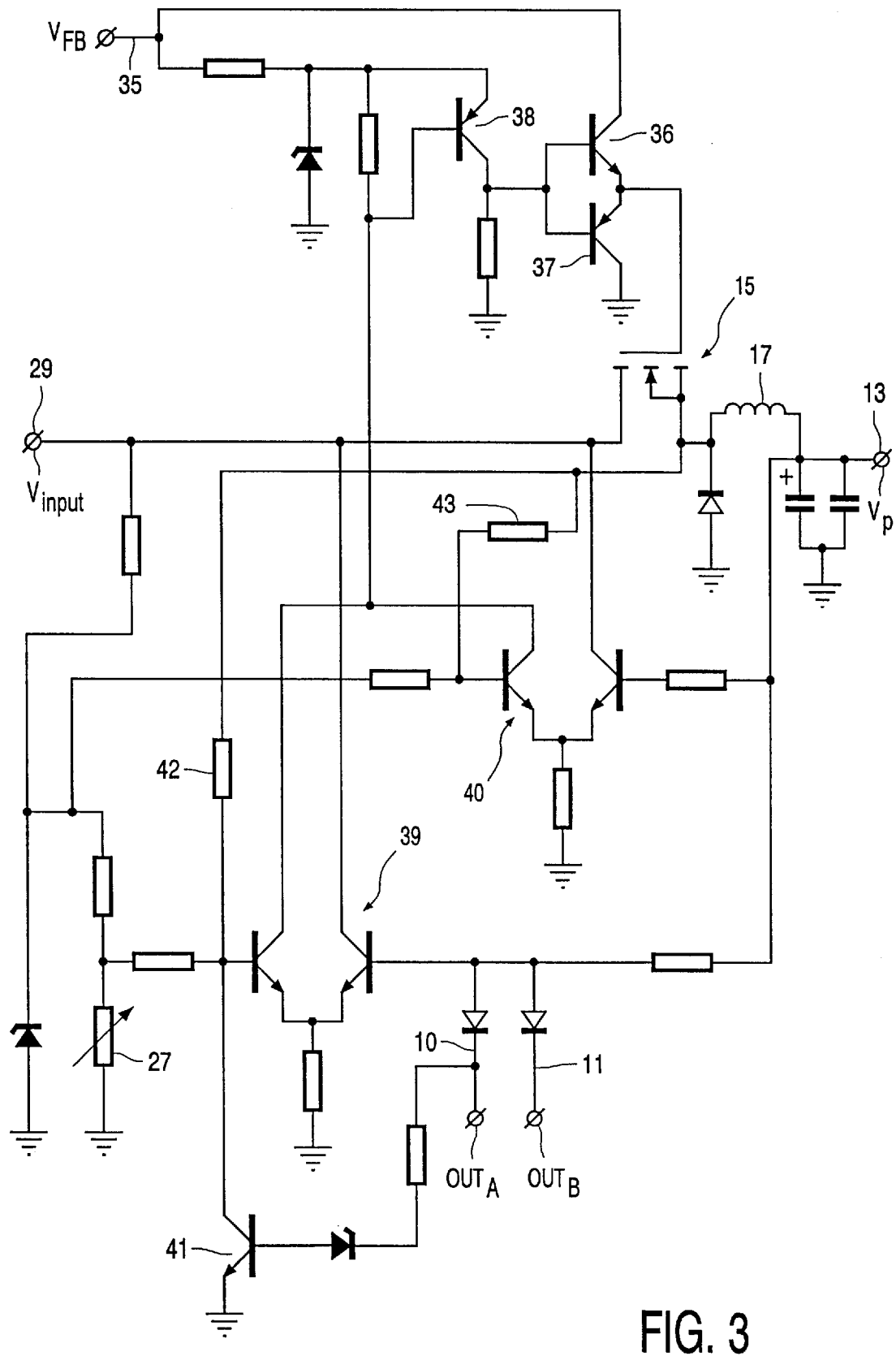
FIG. 3 shows a first alternative according to the invention for the configuration of FIG. 2.

The circuit of FIG. 3 is to be connected to a vertical deflection amplifier in a bridge configuration. The switching transistor 15 is driven by a class B stage formed by transistors 36, 37 and its pre-stage 38. The control is done by two differential pairs 39, 40. Pair 39 keeps one of the outputs at a constant voltage level and pair 40 prevents the output supply voltage from becoming too low. The minimum supply voltage can e.g. be 7 V. Transistor 41 switches the control off during flyback, otherwise the control would increase the supply voltage unnecessarily. During flyback, output $OUT_B$ of the output stage 6 in FIG. 1 goes to zero but the modulator should not react.

The minimum output voltage of the vertical stage can be adjusted with the adjustable resistor 27. The resistors 42 and 43 between one side of the inductor and the inputs of the differential pairs 39, 40 shift the switching point of the control, thereby making a hysteresis.

The outputs $OUT_A$, $OUT_B$ are connected to the vertical deflection coil 2 in FIG. 1. Since the vertical deflection coil 2 is close to the horizontal deflection coil (not shown) there is a small amount of cross-talk of the horizontal deflection coil to the vertical deflection coil. Especially the horizontal flyback pulses are visible as very small voltage spikes on both ends of the vertical deflection coil 2. These spikes are usually big enough to guarantee that the supply modulator switches at line frequency.

Figure 4:
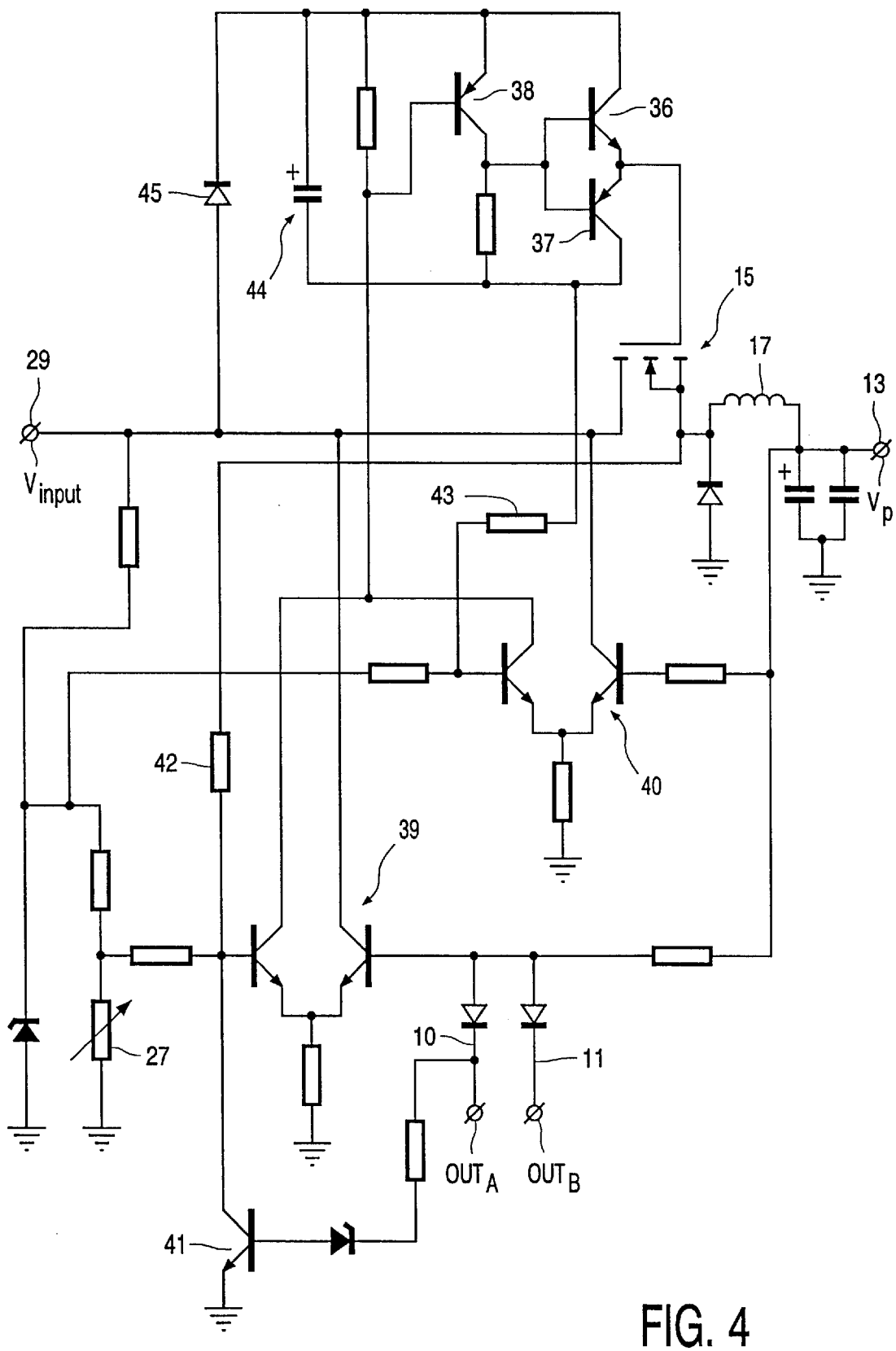
FIG. 4 shows a second alternative.

The circuit presented in FIG. 3 is susceptible to further improvement. It wastes some power from the flyback supply. To make the circuit more economical, bootstrapping can be used, as shown in FIG. 4. Capacitor 44 is charged through diode 45 as long as transistor 15 is off. The charge in capacitor 44 provides the drive circuit with transistors 36–38 with power to control transistor 15. If transistor 15 is switched on, the voltage at the source of transistor 15 becomes high, equal to $V_{input}$. Diode 45 will block because the voltage across capacitor 44 is lifted or bootstrapped; it is in series with the supply voltage. In this way the gate voltage of transistor 15 can be raised above the supply source voltage $V_{input}$. For optimal performance the bootstrapping diode 45 should be as fast as possible. A Schottky diode can be used in a preferred embodiment.

Figure 5:
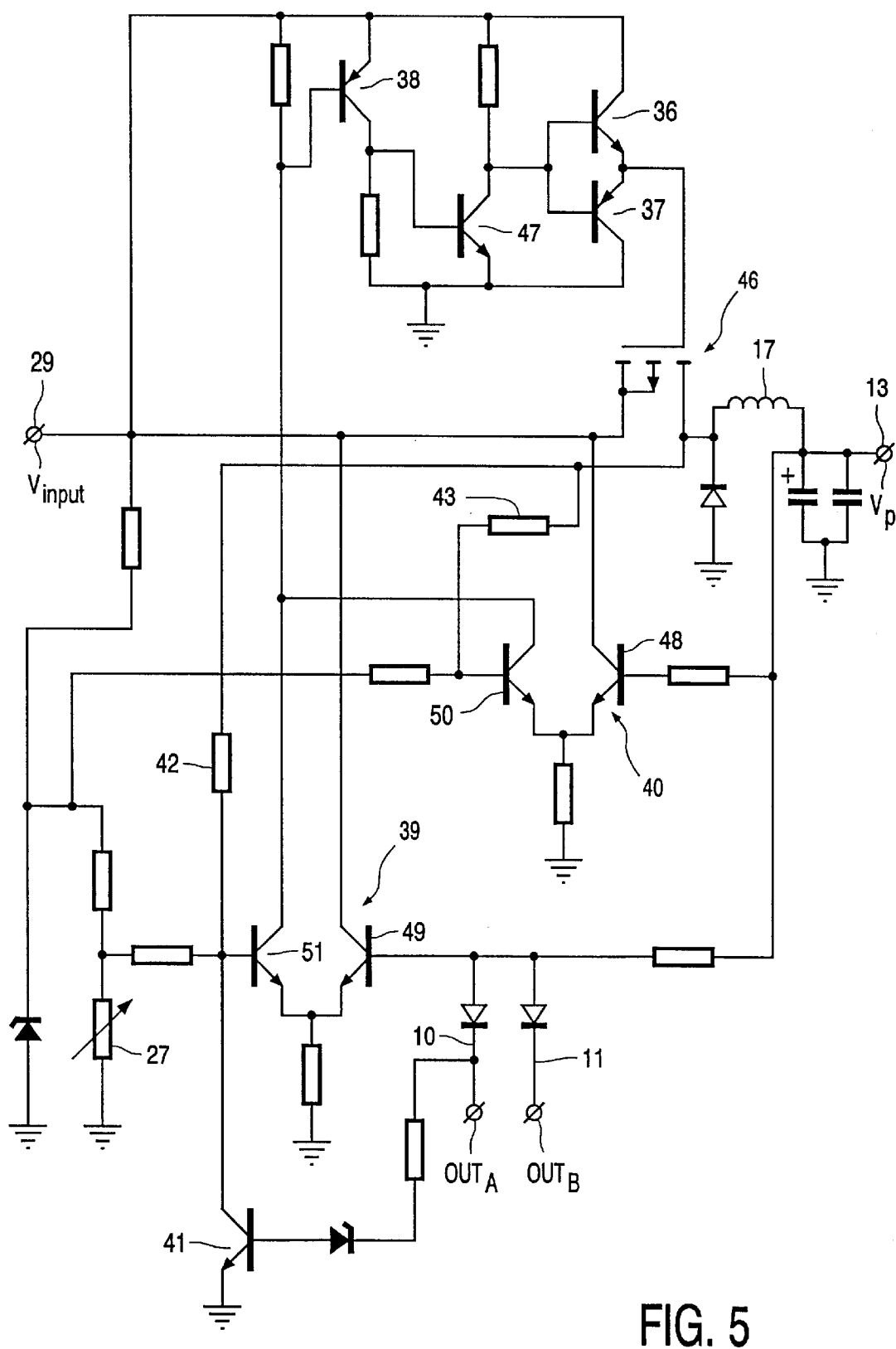
FIG. 5 shows a third alternative.

Another option is to use a PMOS power transistor 46 instead of the NMOS power transistor 15, as shown in FIG. 5. As can be seen in FIG. 5 the circuit contains another transistor 47 acting as an inverter which is the most robust manner of adapting the configuration of FIG. 4 to the use of PMOS transistor 46. Alternatively, the collectors of the left transistors 50, 51 of the pairs 30, 40 only pull current if the output voltage of the vertical stage 51 or if $V_P$ 50 is too low. In this case either one of the outputs of the vertical stage is too low or $V_P$ is too low. So only one transistor will 'ignite' the switch. Now imagine that 49 and 48 are used to control the switch. Both collectors 49 and 48 pull current if the output voltage of the vertical stage 49 or if $V_P$ 48 is too high. And neither collector will pull current if the output voltage of the vertical stage and if $V_P$ is too low. The problem is that this situation is not supposed to occur. But if either the output voltage of the vertical stage or $V_P$ is too low, one transistor is shut off and the other still conducts. So, either both transistors 48, 49 pull current or only one of them pulls current, causing a voltage drop across the base emitter of transistor 38. Another alternative to solve this dilemma is to choose the right resistor value, to require that the voltage across the resistor with one transistor conducting should be lower than 0.6 V, and to set the tail currents of both differential pairs 39, 40 to be identical, but as stated above an inverter with transistor 47 is preferred as it is more robust.

Figure 6:
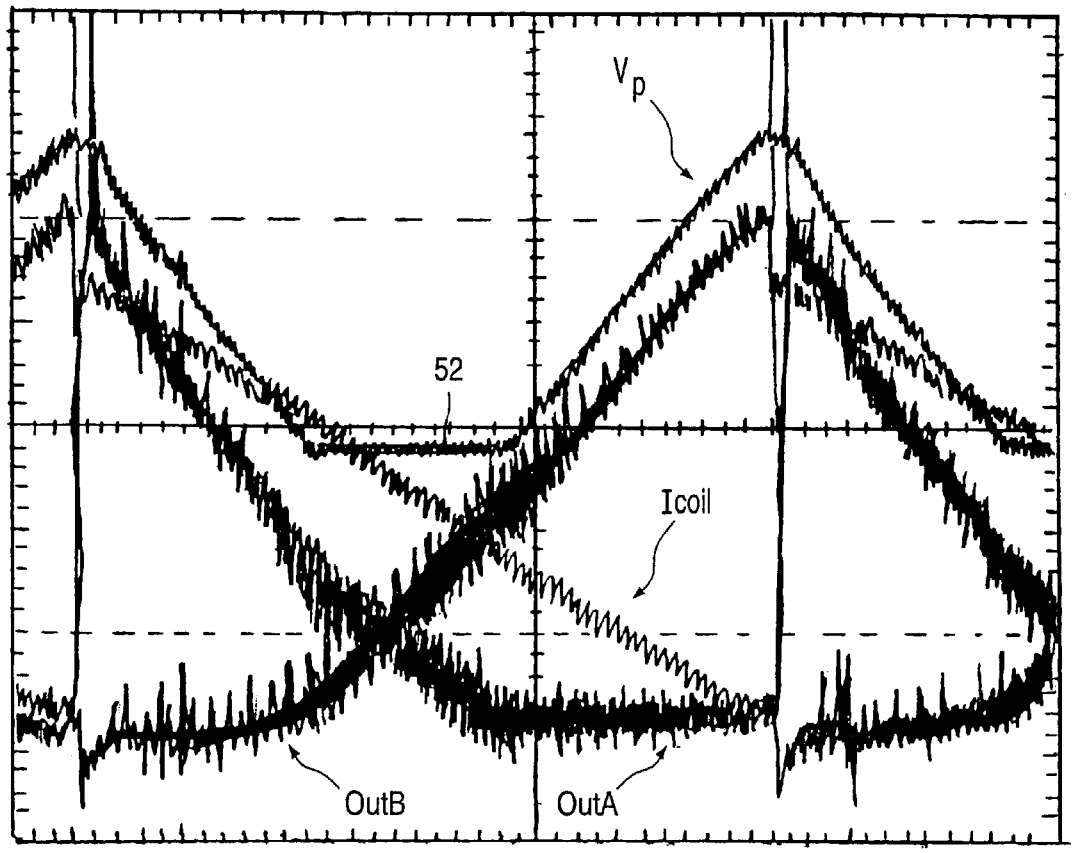
FIG. 6 shows a graph of the currents and voltages during a scan to illustrate an example of functioning of a power supply according FIG. 3.

FIG. 6 shows a graph of $V_P$, together with $OUT_A$, $OUT_B$ and $I_{coil}$, being the current through coil 2. All features described above especially in relation to FIGS. 2 and 3, can be seen here, such as the minimum power level 52 set by the minimum power supply level set circuit to ensure continued functioning of the IC 7 in FIG. 1, which could be impaired of $V_P$ were allowed to decrease to zero.

After having acquainted himself with the description of a preferred embodiment of the present invention above, the person skilled in the art will immediately realize numerous alternatives and other embodiments within the scope of the present invention, as it is defined in the appended claims. Therefore the specifically shown and described embodiments are not to be considered restrictive for the present application. For example the vertical deflection circuit described in conjunction with FIG. 1 could be any other configuration than the bridge configuration described and shown, for instance one where a single output (and a single feedback) line are used to drive the vertical deflection coil. Such a configuration, however, requires modulation of a positive and a negative power supply, complicating the control and increasing costs. In the preferred embodiment above, especially in relation to FIG. 2, the power supply has been described as adaptive. As an alternative, separate power supplies that have distinct power supply levels could be used with switching means to connect one of the power supplies with an appropriate level to the power supply input of the vertical deflection circuit. Herein the adapter would comprises a switch means and an additional power source, and in use connects the power supply output and one of the power source and the additional power source, dependent on the first input, with preferably the additional power source having a lower voltage than the power source.

Although above a switching power transistor in the adaptive power supply has been described, any other kind of switching means (e.g. thyristors, bipolar transistors) in combination with output level determining means could be considered, dependent on other constraints and features of the actually used circuitry. Further, the switching means are, according to the embodiments described above, provided with switching frequency signals derived from line ripple frequencies in the deflection coil, but the switching frequency could as an alternative also be provided by a separate generator, optionally forming external means. While the invention has been described in relation to vertical deflection, the invention can be used with horizontal deflection in a transposed scanning configuration in which the lines are vertical and the field scanning direction is horizontal.

While the invention is preferably applied in a deflection circuit, it may be used in any other environment where a time-variable power supply is applied to a coil, e.g. in a windshield wiper motor.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A power supply circuit (9) for a deflection circuit (1), said deflection circuit (1) comprising:
    a deflection coil (2) for a display tube;
    a drive circuit (4,5,6) coupled to said deflection coil; and
    wherein said power supply circuit (9) comprises:
        a first input (10,11) coupled to an output of the drive circuit and one side of the deflection coil;
        a second input coupled to a power source ($V_{input}$);
        a power supply output (13) coupled to the drive circuit (4,5,6); and
        an adapter (15, 46) for adapting a value of power ($V_P$) supplied to the power supply output (13) from the second input ($V_{input}$) dependent on the first input.

2. A power supply circuit (9) according to claim 1, wherein the adapter comprises a modulator for continuously modulating the value of power ($V_P$) to allow the drive circuit not more than a voltage range it needs.

3. A power supply circuit (9) according to claim 1, wherein the drive circuit (4,5,6) has two outputs (10, 11) coupled to respective ends of the deflection coil (2), and wherein the power supply circuit (9) comprises two inputs respectively connected to the two outputs of the drive circuit (4,5,6).

4. A power supply circuit (9) according to claim 1, wherein the adapter comprises a circuit with a coil (17), a diode (18) and a capacitor.

5. A power supply circuit (9) according to claim 1, comprising a switch (15) connected between said power supply output (13) and said power source ($V_{input}$).

6. A power supply circuit (9) according to claim 5, wherein the switch is a field effect power transistor (15) having a gate coupled to said power source to be driven in full conductance.

7. A power supply circuit (9) according to claim 1, comprising a minimum power supply level set circuit (31, 40) for defining a minimum power level to be output to the deflection circuit.

8. A power supply circuit (9) according to claim 1, comprising a start-up circuit (25–28).

9. A display apparatus, comprising:
    a display tube;
    a deflection circuit; and
    a power supply circuit (9) for the deflection circuit as claimed in claim 1.

10. A power supply circuit (9) for a device, said device comprising:
    a coil (2) for driving the device;
    a drive circuit (4,5,6) coupled to said coil; and
    wherein said power supply circuit (9) comprises:
        a first input (10,11) coupled to an output of the drive circuit and the coil;
        a second input coupled to a power source ($V_{input}$);
        a power supply output (13) coupled to the drive circuit (4,5,6); and
        an adapter (15, 46) for adapting a value of power ($V_P$) supplied to the power supply output (13) from the second input ($V_{input}$) dependent on the first input, the adapter comprising a modulator for continuously modulating the value of power ($V_P$) to allow the drive circuit no more than a voltage range it needs.

11. A method for providing a power supply circuit (9) for a deflection circuit (1), wherein said deflection circuit (1) is of the type comprising a deflection coil (2) for a display tube and a drive circuit (4,5,6) coupled to said deflection coil (2), said method comprising the steps of:
    coupling a first input (10, 11) of said power supply circuit (9) to an output of said drive circuit (4,5,6) and to one side of said deflection coil (2);
    coupling a second input of said power supply circuit (9) to a power source ($V_{input}$);
    coupling a power supply output (13) of said power supply circuit (9) to said drive circuit (4,5,6); and
    adapting a value of power ($V_P$) supplied to said power supply output (13) from said second input ($V_{input}$) dependent on said first input (10,11).

12. A method according to claim 11, wherein the step of adapting said value of power ($V_P$) comprises:
    continuously modulating said value of power ($V_P$) to allow said drive circuit (4,5,6) not more than a voltage range it needs.

13. A method according to claim 11, wherein said drive circuit (4,5,6) has two outputs (10, 11) coupled to respective ends of said deflection coil (2), and wherein said power supply circuit (9) comprises two inputs respectively connected to the two outputs of the drive circuit (4,5,6).

14. A method according to claim 11, wherein the step of adapting said value of power ($V_P$) comprises the step of:
    modulating said value of power ($V_P$) with a circuit that comprises a coil (17), a diode (18) and a capacitor.

15. A method according to claim 11, wherein the step of adapting said value of power ($V_P$) comprises the step of:
    modulating said value of power ($V_P$) with a circuit that comprises a switch (15) connected between said power supply output (13) and said power source ($V_{input}$).

16. A method according to claim 15, wherein said switch is a field effect power transistor (15) having a gate coupled to said power source ($V_{input}$) to be driven in full conductance.

17. A method according to claim 11, further comprising the step of:
    using a minimum power supply level set circuit to define a minimum power level to be output to said deflection circuit.

18. A method according to claim 11, further comprising the step of:
    coupling a start-up circuit to said power supply circuit (9).

19. A method according to claim 11, further comprising the steps of:

coupling said deflection circuit (1) to a display apparatus; and coupling said power supply circuit (9) to said deflection circuit (1).

* * * * *